(12) United States Patent
Viner et al.

(10) Patent No.: US 8,556,720 B2
(45) Date of Patent: Oct. 15, 2013

(54) SYSTEM AND METHOD FOR TOUCHSCREEN VIDEO GAME COMBAT

(75) Inventors: Michael Viner, Valley Village, CA (US); Stephen Jarret, Los Angeles, CA (US)

(73) Assignee: Disney Enterprises, Inc., Burbank, CA (US)

( * ) Notice: Subject to any disclaimer, the term of this patent is extended or adjusted under 35 U.S.C. 154(b) by 1217 days.

(21) Appl. No.: 12/014,003

(22) Filed: Jan. 14, 2008

(65) Prior Publication Data

US 2009/0181770 A1    Jul. 16, 2009

(51) Int. Cl.
*G06F 17/00* (2006.01)

(52) U.S. Cl.
USPC ............... 463/37; 463/36; 463/32; 463/38

(58) Field of Classification Search
USPC .......................... 463/37, 32, 38, 36
See application file for complete search history.

(56) References Cited

U.S. PATENT DOCUMENTS

| | | | |
|---|---|---|---|
| 6,921,336 B1 * | 7/2005 | Best ............................ | 463/32 |
| 2005/0227762 A1 | 10/2005 | Tahara et al. | |
| 2006/0252538 A1 * | 11/2006 | Olsen et al. ................. | 463/36 |
| 2006/0252540 A1 | 11/2006 | Kando et al. | |
| 2007/0105626 A1 * | 5/2007 | Cho et al. .................... | 463/37 |

FOREIGN PATENT DOCUMENTS

| | | |
|---|---|---|
| EP | 1671685 A2 | 6/2006 |
| EP | 1 795 243 A1 | 6/2007 |
| JP | 2002-000939 A | 1/2002 |
| JP | 2004073682 A | 3/2004 |
| JP | 2005204720 A | 8/2005 |
| JP | 2005319175 A | 11/2005 |

OTHER PUBLICATIONS

Disney's "Pirates of the Caribbean—At World's End", *Disney Interactive Studios*, Game Release Date: May 22, 2007; 2 pages.
"Spider-Man III"; *ActiVision*; Game Release Date: May 4, 2007, 3 pages.
International Search Report and Written Opinion dated Jul. 15, 2009.

* cited by examiner

*Primary Examiner* — Michael Cuff
(74) *Attorney, Agent, or Firm* — Patterson & Sheridan, LLP

(57) ABSTRACT

An interactive computerized game system including a visual display, one or more user input devices, and a processor executing software that interacts with the display and input device(s) is disclosed. The software displays images of avatars. At least one of the user input devices is a touchscreen. During gameplay, the gameplayer may touch the touchscreen to provide input. An animation is displayed in response to user input matching a predefined input.

24 Claims, 7 Drawing Sheets

SYSTEM AND METHOD FOR TOUCHSCREEN VIDEO GAME COMBAT

BACKGROUND OF THE INVENTION

1. Field of the Invention

This application generally relates to interactive computerized game systems.

2. Description of the Related Technology

In existing role-playing games, the gameplayer activates buttons or keys on a game controller to control the actions of an avatar displayed onscreen. Many games involve a touchscreen which the gameplayer interacts with in order to control the movement of an avatar displayed onscreen, or to navigate user interface menus

SUMMARY OF THE INVENTION

In one embodiment, the invention comprises a method comprising displaying at least one avatar, displaying at least one graphical user input element on a touch screen in response to a selection of one of the at least one avatar, receiving user input from the touch screen, and displaying a real time animation for user input which matches a predefined input, wherein a physical action performed by a user with respect to the user input emulates one or more actions of the animation displayed.

In another embodiment, the invention comprises a system comprising a visual display configured to display at least one avatar, at least a portion of the visual display comprising a touch screen configured to receive user input in response to the displayed image of the at least one avatar; and a processor executing software configured to receive user input from the touch screen, display at least one graphical user input element on the touch screen in response to a selection of one of the at least one avatar, receive user input from the touch screen, and display a real time animation when the user input matches a predefined input, wherein a physical action performed by a user with respect to the user input emulates one or more actions of the animation displayed.

In another embodiment, the invention comprises a computer readable medium having computer executable instructions stored thereon which, when executed, cause a computing device to perform a method of simulating an attack, the method comprising displaying at least one avatar, receiving user input from a touch screen, displaying at least one graphical user input element on the touch screen in response to a selection of one of the at least one avatar, receiving user input from the touch screen, and displaying a real time animation when the user input matches a predefined input, wherein a physical action performed by a user with respect to the user input emulates one or more actions of the animation displayed.

In another embodiment, the invention comprises a system comprising means for displaying at least one avatar, means for receiving user input, means for displaying at least one graphical user input element in response to a selection of one of the at least one avatar, and means for displaying a real time animation when the user input matches a predefined input, wherein a physical action performed by a user with respect to the user input emulates one or more actions of the animation displayed.

DETAILED DESCRIPTION OF CERTAIN INVENTIVE EMBODIMENTS

Figure 1:
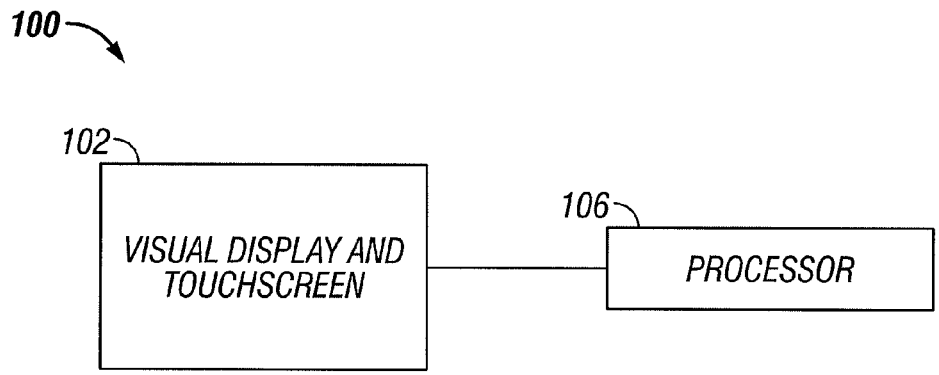
FIGS. 1-3 are block diagrams of game systems according to various embodiments.

The following detailed description of certain embodiments presents various descriptions of specific embodiments of the invention. However, the invention can be embodied in a multitude of different ways as defined and covered by the claims. In this description, reference is made to the drawings wherein like parts are designated with like numerals throughout.

The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

The system is comprised of various modules, tools, and applications as discussed in detail below. As can be appreciated by one of ordinary skill in the art, each of the modules may comprise various sub-routines, procedures, definitional statements and macros. Each of the modules are typically separately compiled and linked into a single executable program. Therefore, the following description of each of the modules is used for convenience to describe the functionality of the preferred system. Thus, the processes that are undergone by each of the modules may be arbitrarily redistributed to one of the other modules, combined together in a single module, or made available in, for example, a shareable dynamic link library.

The system modules, tools, and applications may be written in any programming language such as, for example, C, C++, BASIC, Visual Basic, Pascal, Ada, Java, HTML, XML, or FORTRAN, and executed on an operating system, such as variants of Windows, Macintosh, UNIX, Linux, VxWorks, or other operating system. C, C++, BASIC, Visual Basic, Pascal, Ada, Java, HTML, XML and FORTRAN are industry standard programming languages for which many commercial compilers can be used to create executable code.

All of these embodiments are intended to be within the scope of the invention herein disclosed. These and other embodiments of the present invention will become readily apparent to those skilled in the art from the following detailed description of the preferred embodiments having reference to the attached figures, the invention not being limited to any particular preferred embodiment(s) disclosed.

Various embodiments of the invention provide a system and method of gameplay which is carried out using a touchscreen device to control the actions of an avatar displayed onscreen. Embodiments may help create an experience in which the actions of the avatar emulate the physical actions performed by the gameplayer.

Embodiments of the invention generally involve a visual display configured to display an image of at least one avatar. As used in this description, the term "avatar" can refer to any image, graphic, device, symbol and/or the like that represents a character that is displayed onscreen. The character displayed may be a human character or may be a fantastical character including but not limited to monsters and trolls. In certain embodiments of the invention, an avatar may represent the gameplayer's on-screen in-game persona. In other embodiments, avatars may represent other in-game personas the gamplayer has no control over. In another embodiment, the gamplayer may control a plurality of avatars and these avatars may each represent a different in-game persona.

With reference now to FIG. 1, a block diagram illustrates an exemplary system for playing a video game such as, e.g., a game machine, handheld game device, console game device, and the like. Another platform for gameplay could be a television set with internal or external software application execution capability. The device 100 generally includes a visual display 102 connected to a processor 106. At least a portion of the visual display 102 is a touchscreen. The visual display 102 may be configured to display an image an avatar. The touchscreen portion of the visual display 102 may be configured to receive user input in response to the displayed image of an avatar. The touchscreen may, for example, be configured to display a variety of graphical user input elements in response to the gamplayer's selection of an avatar. For example, the touchscreen portion may include a display of one or more targets or sliders. The processor 106 may execute software configured to display an animation in response to the user input received which matches a predefined input. There may be an animation displayed when any user input matches a predefined input or pattern, or for each user input which matches a predefined input.

The animation displayed may be real-time with respect to the user input. By "real time" it is meant that the animation is created dynamically while the user input is received. In this manner the animation continues to change as a user manipulates a continuous control such as a slider bar. The animation may stop immediately when the user input stops, or it may continue to a predefined completion point once the user input stops.

The physical actions the gameplayer may take in providing the user input emulates the animations displayed. By "emulate" it is meant that the physical action taken by the gamplayer indicates or represents the animation displayed. The physical action taken by the gameplayer may not exactly represent the animation displayed. For example, the physical action of tapping a graphical user input element on the screen may correspond to a stabbing or thrusting animation. Or, the physical action of sliding a graphical user input element may correspond to a slashing or sweeping animation.

Figure 2:
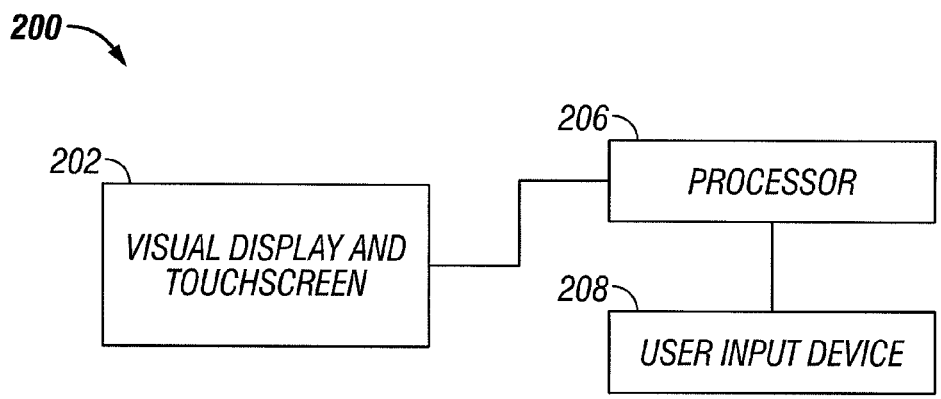

FIG. 2 illustrates an alternative embodiment, in which a device 200 includes a visual display 202, a processor 206, and at least one user input device 208. At least a portion of the visual display 202 is a touchscreen. The user input device 208 may comprise any device suitable for receiving user input, for example, a button or set of buttons, a keypad, or a directional pad ("D-pad"). In an embodiment including a D-pad input device, for example, each leg of the D-pad may be configured to control the movement of a particular avatar displayed on the visual display 202. For example, the upper leg of the D-pad may be configured to move an avatar in a forward direction on the visual display 202.

Figure 3:
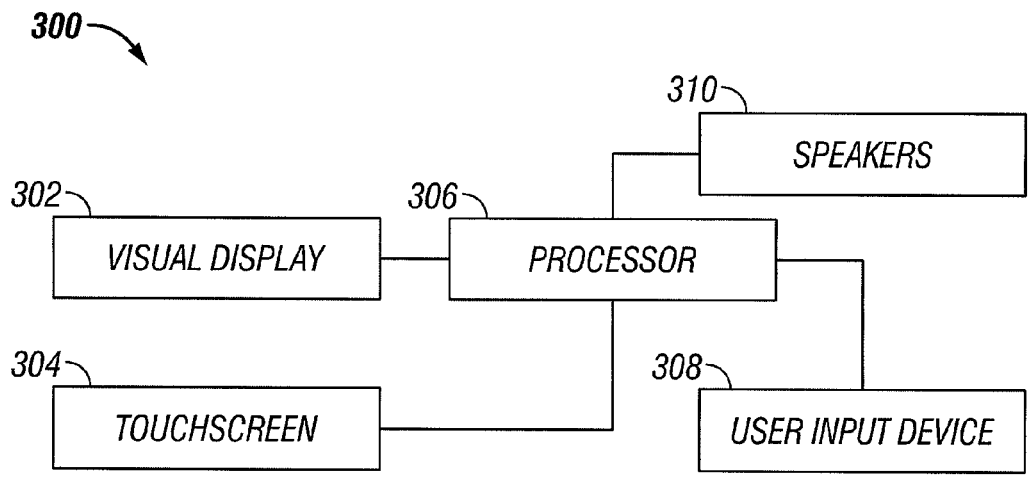

Embodiments of the invention may include a visual display having two or more visually separate portions. As illustrated in FIG. 3, a device 300 may include a visual display having a non-touchscreen portion 302 and a visually separate touchscreen portion 304. The device 300 may further include speakers 310.

In certain embodiments of the invention, the user input comprises input to a touchscreen. Touchscreen input can be achieved with a stylus, with an adapted stylus in the form of a pointing object, with a finger, or the like. Herein, the specification will use the term "stylus" to refer to any object used to provide input to the touchscreen. The specification in no way limits the types of objects which may be used to provide input to the touchscreen.

Many game systems provide a controller pad to receive user input. A controller pad generally comprises a directional pad and a variety of buttons and keys. Some game systems provide a touchscreen which allows the user to use a stylus to provide input. Traditional games solely use the controller pad to accept user input. One embodiment according to the invention incorporates the touchscreen into the gameplay. Another embodiment provides at least one graphical user input element on the touchscreen. The gameplayer interacts with the touchscreen and the graphical user input elements displayed on the touchscreen such that the actions of the avatar emulate the actions of the gameplayer. The gameplayer feels a direct physical connection between his actions and the actions of the avatar because the avatar's actions displayed onscreen are emulating the actions of the gameplayer. This creates gameplay that is more immersive and interactive than the traditional methods of gameplay.

Figure 4A:
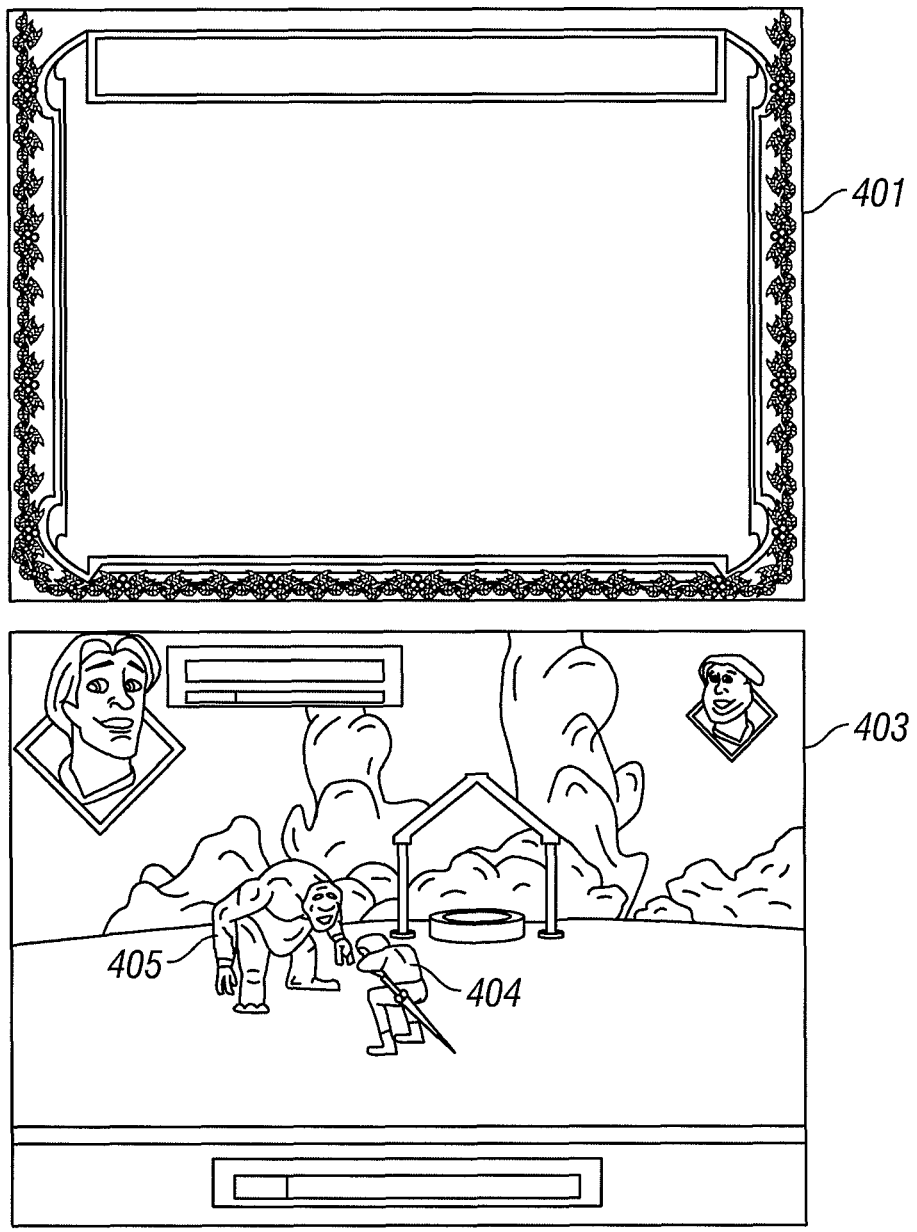
FIG. 4A is a diagram of the visual display and touchscreen of a game system according to a certain embodiment of the invention.

FIG. 4A illustrates a visual display of an embodiment as used in a game designed for a portable game machine such as the Nintendo DS™. The visual display has a non-touchscreen portion 401 and a touchscreen portion 403. As can be seen in the figure, the touchscreen portion 403 displays an image of at least one avatar.

Figure 4B:
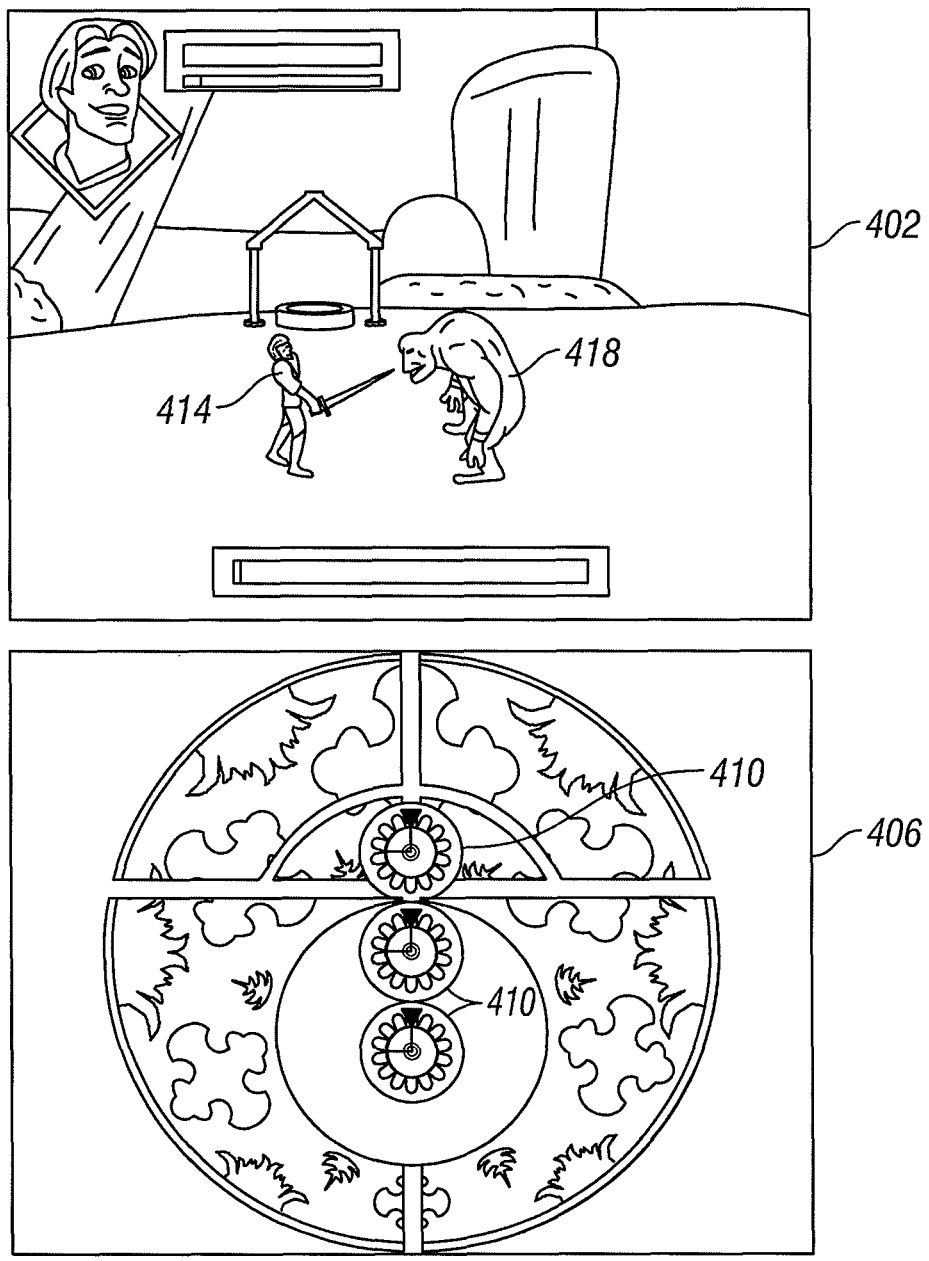
FIG. 4B is a diagram of the visual display and touchscreen of a game system according to an embodiment of the invention.

FIG. 4B illustrates a visual display of an embodiment as used in a game designed for a portable game machine such as the Nintendo DS™. The visual display has a non-touchscreen portion 402 and a touchscreen portion 406. The visual display shown in FIG. 4B is displayed in response to a user input received from the touchscreen portion shown in FIG. 4A. The user selects an avatar on the touchscreen shown in FIG. 4A and the visual display from FIG. 4B is displayed. As can be seen in the figure, the non-touchscreen portion 402 displays an image of at least one avatar. A first avatar 414 and a second 418 are displayed on the non-touchscreen portion 402. Touchscreen portion 406 displays at least one graphical user input element. Targets 410 are displayed on the touchscreen portion 406 of the visual display. Each of the targets 410 correspond to a predefined input. As the user makes contact with or taps the touchscreen portion of the display at the area of the touchscreen that corresponds to the target 410, avatar 414 will perform a stab or thrust attack on avatar 418. The action the avatar 414 performs emulates the physical action of the user tapping the touch screen. There may be a plurality of targets 410 displayed on the touchscreen portion. Each time the user input corresponds with tapping a target 410, the avatar displayed on the non-touchscreen portion will perform a stab or thrust attack.

Figure 4C:
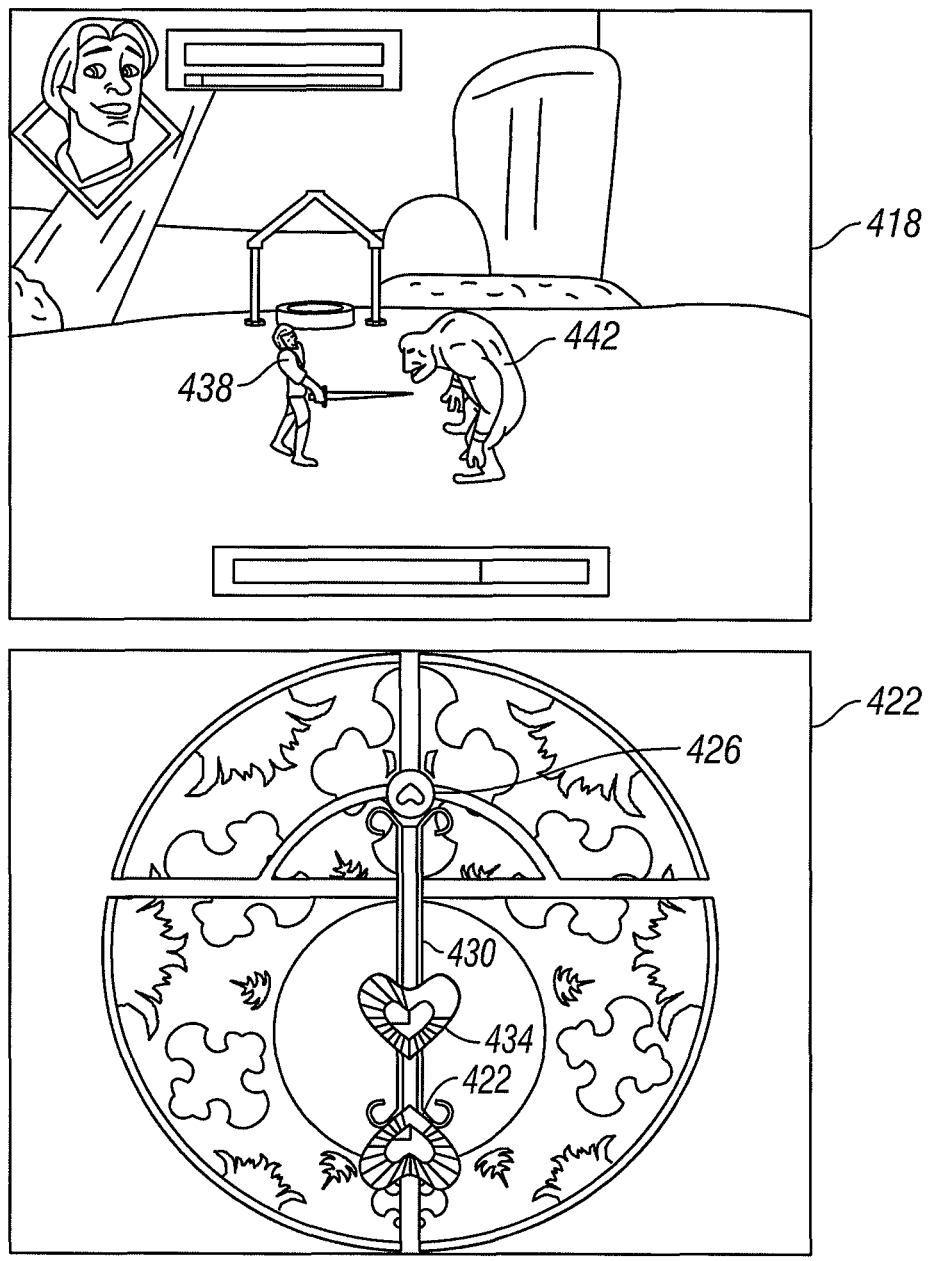
FIG. 4C is a diagram of the visual display and touchscreen of a game system according to another embodiment of the invention.

FIG. 4C further illustrates a visual display of another embodiment as used in a game designed for a portable game machine such as the Nintendo DS™. Similar to FIG. 4A and FIG. 4B, the visual display has a non-touchscreen portion 418 and a touchscreen portion 422, and a first avatar 438 and a second avatar 442 are displayed on the non-touchscreen portion 422. The visual display shown in FIG. 4C is displayed after the animations displayed in FIG. 4B. Touchscreen portion 422 displays at least one graphical user input element. A slider 430 is displayed on the touchscreen portion 422. The slider 430 has a starting point 426, and ending point 422 and a sliding component 434. The slider 430 corresponds to a predefined input. The slider 430 may have different lengths and patterns. For example, the slider 430 may be in the shape of a spiral, or it may be simply be a series of connected lines. As the user makes contact with or slides the stylus across the touchscreen portion of the display at the area of the touchscreen that corresponds to the slider, the avatar 438 will perform a slash or slice attack on avatar 442. The slicing or slashing action the avatar 438 performs emulates the physical action of the user sliding or dragging the stylus across the touchscreen portion.

Figure 4D:
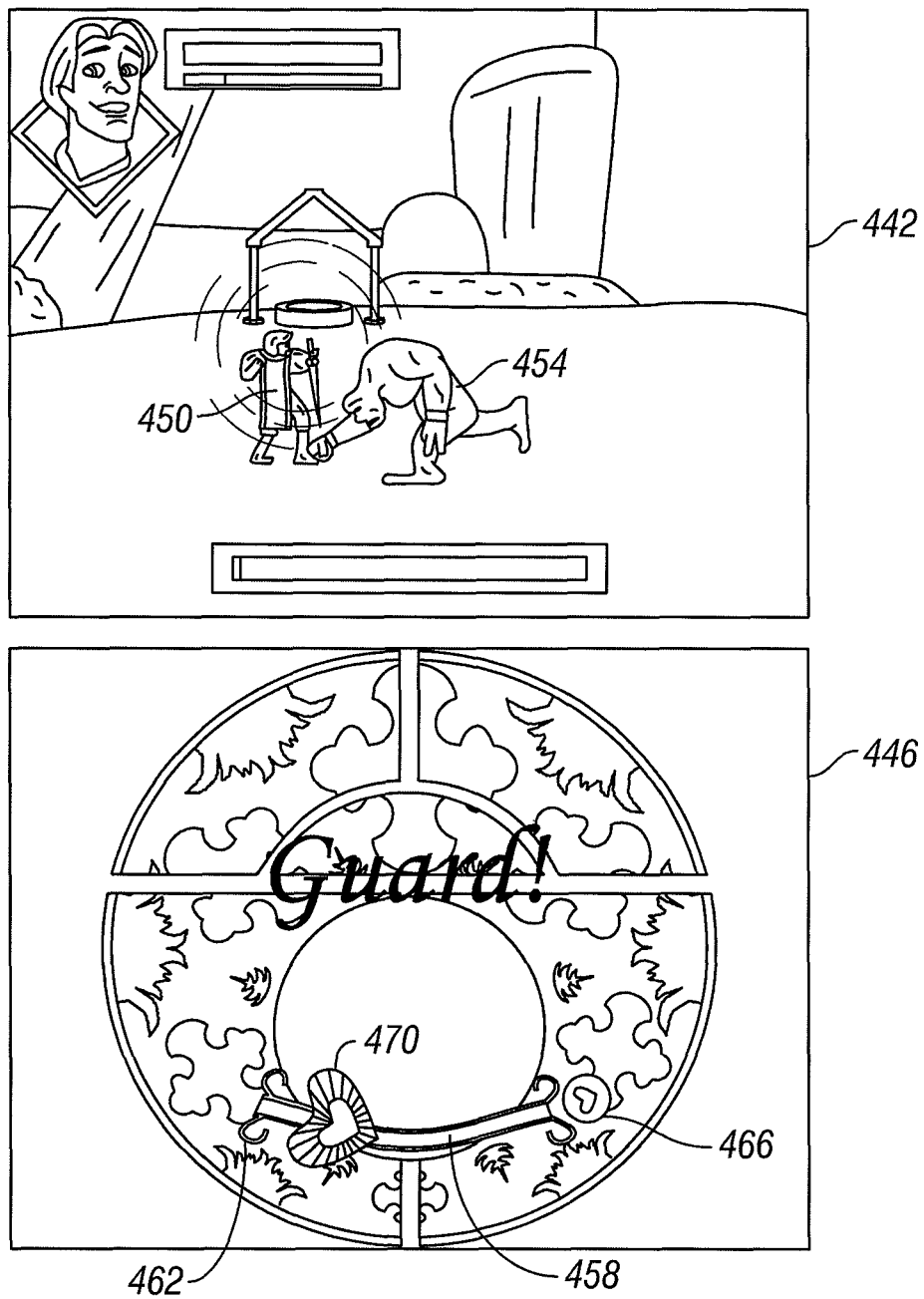
FIG. 4D is a diagram of the visual display and touchscreen of a game system according to still another embodiment of the invention.

FIG. 4D further illustrates a visual display of still another embodiment as used in a game designed for a portable game machine such as the Nintendo DS™. Similar to FIGS. 4A and 4B the visual display has a non-touchscreen portion 442 and a touchscreen portion 446, and a first avatar 450 and a second avatar 454 are displayed on the non-touchscreen portion 446. Touchscreen portion 446 displays at least one graphical user input element. A slider 458 is displayed on the touchscreen portion 446. The slider 458 has a starting point 462, and ending point 466 and a sliding component 470. The slider 458 corresponds to a predefined input. The slider 458 may have different lengths and patterns. For example, the slider 458 may be in the shape of a spiral, or it may simply be a series of connected lines. As the user makes contact with or slides the stylus across the touchscreen portion of the display at the area of the touchscreen that corresponds to the slider, the avatar 450 will guard against an attack from avatar 442. The guarding action the avatar 450 performs emulates the physical action of the user sliding or dragging the stylus across the touchscreen portion.

Figure 5A:
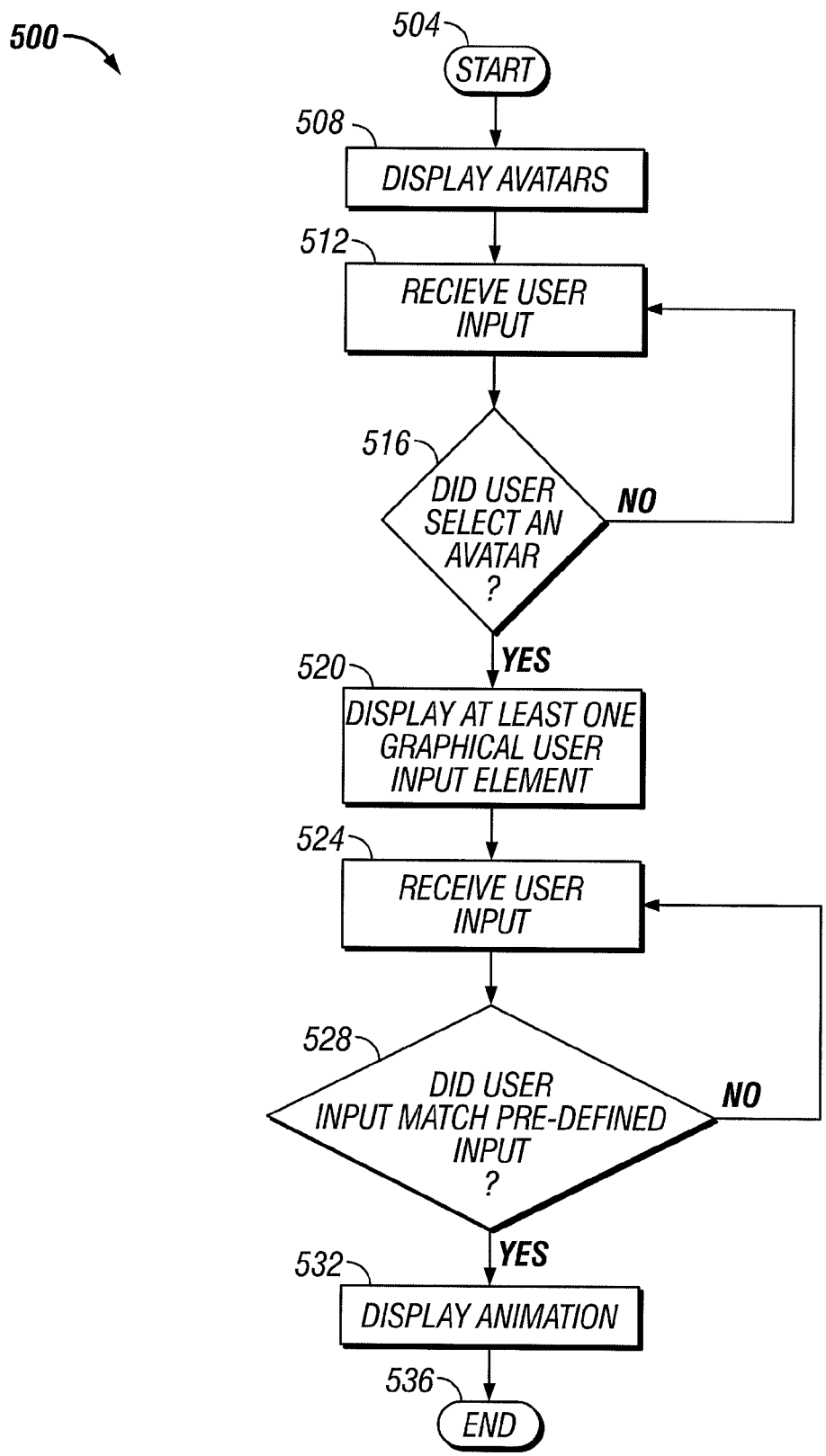
FIG. 5A is a flow diagram of an embodiment of a game process in accordance with the present invention.

FIG. 5A illustrates a basic gameplay process 500 according to an embodiment of the invention. At block 508 at least one avatar is displayed. At block 512, user input is received. The user input comprises input to a touch screen. At block 516, the user input is evaluated to check for a selection of one of the avatars displayed at block 508. In the embodiment illustrated in FIG. 4A, for example, the user contacts the touchscreen at the location where avatar 404 is displayed in order to select the avatar 404.

Referring again to FIG. 5A, if the user input corresponds with the selection of an avatar, then the process moves to block 520, wherein at least one graphical user input element is displayed. At block 524, user input is received. At block 528, the user input is evaluated to determine if a predefined user input was received. For example, as illustrated in FIG. 4B, targets 410 are displayed on touchscreen 406. The user may contact the touchscreen at one of the targets 410. Or, as illustrated in FIGS. 4C and 4D, sliders 430 and 458 are displayed on touchscreens 422 and 446 respectively. In FIG. 4C the user may contact the touchscreen 422 at starting point 426 and drag the stylus across the touchscreen 422 such that the sliding element 434 moves from the starting point 426 to the ending point 422 along the slider 430. Similarly, in FIG. 4D the user contacts the touchscreen 446 at starting point 462 and drags the stylus across the touchscreen 446 such that the sliding element 470 moves from the starting point 462 to the ending point 466 along the slider 458. The movement of the sliding element from the starting point to the ending point on the sliders comprises a predefined input.

Referring again to FIG. 5A, if the user input matches a predefined input, then the process moves to block 532, wherein an animation is displayed on the non-touchscreen portion of the visual display.

Figure 5B:
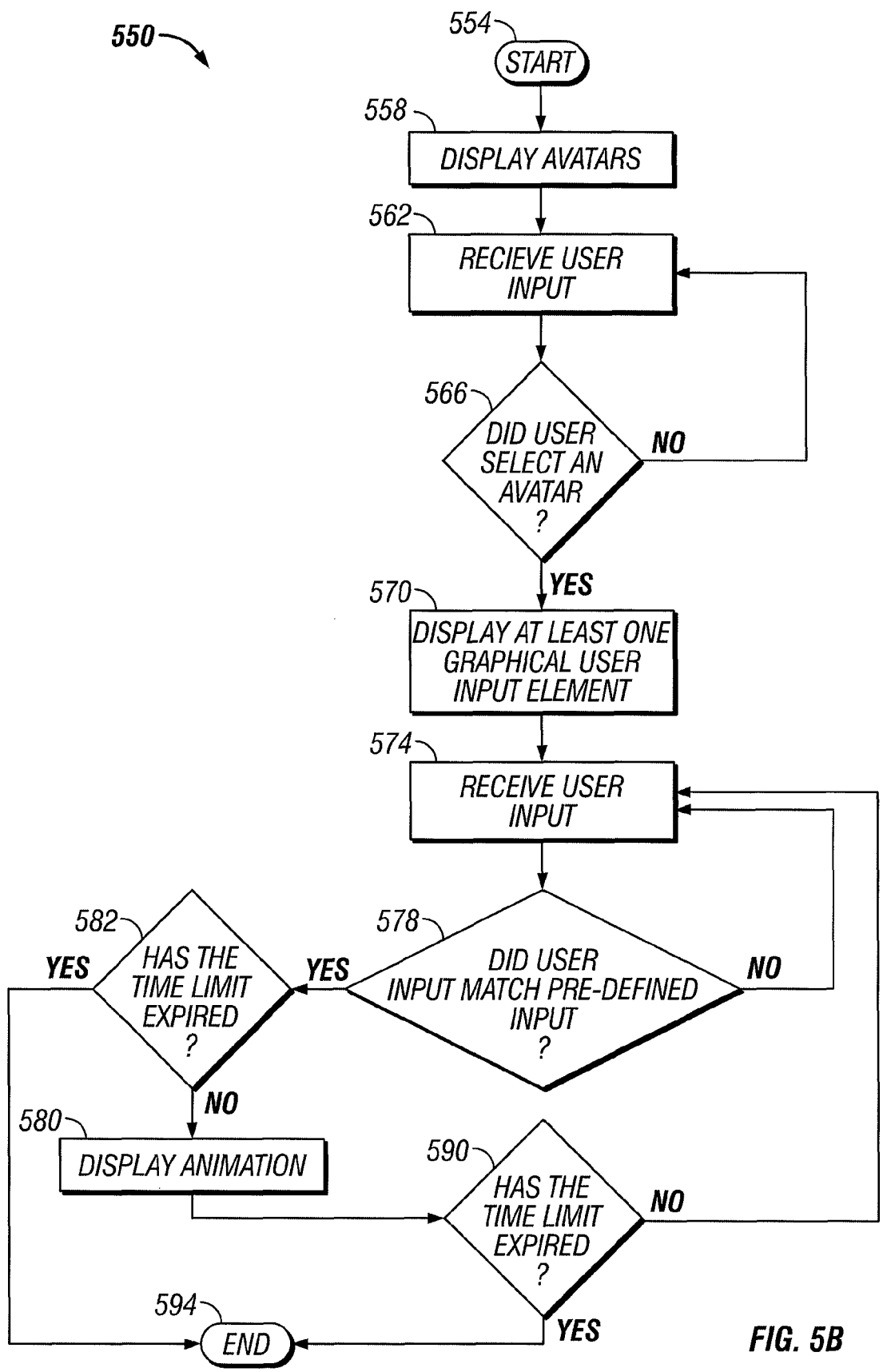
FIG. 5B is a flow diagram of another embodiment of a game process in accordance with the present invention.

FIG. 5B illustrates a basic gameplay process 550 according to another embodiment of the invention. The process described in FIG. 5B is similar to the process in FIG. 5A, but differs such that a time limit is imposed on the user to interact with the touchscreen and provide user input. At block 558 at least one avatar is displayed. At block 562, user input is received. The user input comprises input to a touch screen. At block 566, the user input is evaluated to check for a selection of one of the avatars displayed at block 508. In the embodiment illustrated in FIG. 4A, for example, the user may contact the touchscreen at the location where avatar 404 is displayed in order to select the avatar 404.

Referring again to FIG. 5B, if the user input corresponds with the selection of an avatar, then the process moves to block 570, wherein at least one graphical user input element is displayed. At block 574, user input is received. At block 578, the user input is evaluated to determine if a predefined user input was received. For example, as illustrated in FIG. 4B, targets 410 are displayed on touchscreen 406. The user may contact the touchscreen at one of the targets 410. Or, as illustrated in FIGS. 4C and 4D, sliders 430 and 458 are displayed on touchscreens 422 and 446 respectively. In FIG. 4C the user may contact the touchscreen 422 at starting point 426 and drag the stylus across the touchscreen 422 such that the sliding element 434 moves from the starting point 426 to the ending point 422 along the slider 430. Similarly, in FIG. 4D the user may contact the touchscreen 446 at starting point 462 and drag the stylus across the touchscreen 446 such that the sliding element 470 moves from the starting point 462 to the ending point 466 along the slider 458. The movement of the sliding element from the starting point to the ending point on the sliders comprises a predefined input.

Referring again to FIG. 5B, at block 582, a timer is evaluated to check the amount of time remaining on the timer. If there is time remaining on the timer, the process moves to block 586, wherein an animation is displayed on the non-touchscreen portion of the visual display. At block 590, the timer is evaluated to check the amount of time remaining on the timer. If there is no time remaining on the timer, the process ends. If there is time remaining on the timer, the process will move back to block 574 and loop through blocks 574 to block 590 until the timer expires.

It will be understood that numerous and various modifications can be made from those previously described embodiments and that the forms of the invention described herein are illustrative only and are not intended to limit the scope of the invention.

The above-described method may be realized in a program format to be stored on a computer readable recording medium that includes any kinds of recording devices for storing computer readable data, for example, a CD-ROM, a DVD, a magnetic tape, memory card, and a disk, and may also be realized in a carrier wave format (e.g., Internet transmission or Bluetooth transmission).

While specific blocks, sections, devices, functions and modules may have been set forth above, a skilled technologist will realize that there are many ways to partition the system, and that there are many parts, components, modules or functions that may be substituted for those listed above.

While the above detailed description has shown, described, and pointed out the fundamental novel features of the invention as applied to various embodiments, it will be understood that various omissions and substitutions and changes in the form and details of the system illustrated may be made by those skilled in the art, without departing from the intent of the invention.

What is claimed is:

1. A computer-implemented method for interacting with a virtual environment, the method comprising:
displaying, via a touchscreen display device, a plurality of avatars within the virtual environment, the plurality of avatars including a first avatar and a second avatar;
determining a series of different actions of the second avatar relative to the first avatar;
serially displaying, on a touchscreen portion of the touchscreen display device, a series of different graphical user interface (GUI) elements, each GUI element corresponding to a respective action of the series of actions, each GUI element triggerable by a respective predefined input pattern corresponding to a real world physical action, wherein at least one of the GUI elements comprises a slider GUI element;
detecting, for each of the displayed series of GUI elements, the respective predefined input pattern performed by the user and that triggers the respective GUI element; and
causing, for each detected respective predefined input pattern, the first avatar to emulate the respective real world physical action to respond to the action of the second avatar.

2. The computer-implemented method of claim 1, wherein the series of GUI elements includes a first slider GUI element and a second slider GUI element, wherein the first and second slider GUI elements have distinct predefined input patterns, wherein any real world physical action triggering the first slider GUI element does not trigger the second slider GUI element, wherein any real world physical action triggering the second slider GUI element does not trigger the first slider GUI element.

3. The computer-implemented method of claim 2, wherein the respective predefined input pattern comprises one or more line segments, and the respective real world physical action comprises moving a slider element along the one or more line segments.

4. The computer-implemented method of claim 3, wherein a first action of the series of actions of the second avatar is an attack on the first avatar.

5. The computer-implemented method of claim 4, wherein the emulated respective real world physical action of the first avatar comprises at least one of a defensive maneuver and an attack maneuver performed on the second avatar in response to the first action.

6. The computer-implemented method of claim 5, wherein causing the at least one avatar to emulate the respective real world physical action performed by the user comprises dynamically animating, on a non-touchscreen portion of the touchscreen display device, the first avatar in real-time while the user inputs the respective predefined input pattern on the touchscreen portion of the touchscreen display device.

7. The computer-implemented method of claim 6, further comprising causing the at least one avatar to continue emulating the respective real world physical action performed by the user after the user has inputted the respective predefined input pattern and until a predefined completion point is reached.

8. The computer-implemented method of claim 7, wherein displaying the series of GUI elements occurs in response to receiving a selection of the first avatar through the touchscreen portion of the touchscreen display device.

9. A non-transitory computer-readable medium including instructions that, when executed by a processing unit, cause the processing unit to perform the steps of:
displaying, via a touchscreen display device, a plurality of avatars within the virtual environment, the plurality of avatars including a first avatar and a second avatar;
determining a series of different actions of the second avatar relative to the first avatar;
serially displaying, on a touchscreen portion of the touchscreen display device, a series of different graphical user interface (GUI) elements, each GUI element corresponding to a respective action of the series of actions, each GUI element triggerable by a respective predefined input pattern corresponding to a real world physical action, wherein at least one of the GUI elements comprises a slider GUI element;
detecting, for each of the displayed series of GUI elements, the respective predefined input pattern performed by the user and that triggers the respective GUI element; and
causing, for each detected respective predefined input pattern, the first avatar to emulate the respective real world physical action to respond to the action of the second avatar.

10. The non-transitory computer-readable medium of claim 9, wherein the series of GUI elements includes a first slider GUI element and a second slider GUI element, wherein the first and second slider GUI elements have distinct predefined input patterns, wherein any real world physical action triggering the first slider GUI element does not trigger the second slider GUI element, wherein any real world physical action triggering the second slider GUI element does not trigger the first slider GUI element.

11. The non-transitory computer-readable medium of claim 10, wherein the respective predefined input pattern comprises one or more line segments, and the respective real world physical action comprises moving a slider element along the one or more line segments.

12. The non-transitory computer-readable medium of claim 11, wherein a first action of the series of actions of the second avatar is an attack on the first avatar.

13. The non-transitory computer-readable medium of claim 12, wherein the emulated respective real world physical action of the first avatar comprises at least one of a defensive maneuver and an attack maneuver performed on the second avatar in response to the first action.

14. The non-transitory computer-readable medium of claim 13, wherein causing the at least one avatar to emulate the respective real world physical action performed by the user comprises dynamically animating, on a non-touchscreen portion of the touchscreen display device, the first avatar in real-time while the user inputs the respective predefined input pattern on the touchscreen portion of the touchscreen display device.

15. The non-transitory computer-readable medium of claim 14, further comprising causing the at least one avatar to continue emulating the respective real world physical action performed by the user after the user has inputted the respective predefined input pattern and until a predefined completion point is reached.

16. The computer-implemented method of claim 15, wherein displaying the series of GUI elements occurs in response to receiving a selection of the first avatar through the touchscreen portion of the touchscreen display device.

17. A system for interacting with a virtual environment, comprising:
a one or more computer processors: and a memory containing a program, which, when executed by the one or more computer processors, performs an operation for interacting with a virtual environment, the operation comprising:

displaying, via a touchscreen display device, a plurality of avatars within the virtual environment, the plurality of avatars including a first avatar and a second avatar;

determining a series of different actions of the second avatar relative to the first avatar;

serially displaying, on a touchscreen portion of the touchscreen display device, a series of different graphical user interface (GUI) elements, each GUI element corresponding to a respective action of the series of actions, each GUI element triggerable by a respective predefined input pattern corresponding to a real world physical action, wherein at least one of the GUI elements comprises a slider GUI element;

detecting, for each of the displayed series of GUI elements, the respective predefined input pattern performed by the user and that triggers the respective GUI element; and causing, for each detected respective predefined input pattern, the first avatar to emulate the respective real world physical action to respond to the action of the second avatar.

18. The system of claim 17, wherein the series of GUI elements includes a first slider GUI element and a second slider GUI element, wherein the first and second slider GUI elements have distinct predefined input patterns, wherein any real world physical action triggering the first slider GUI element does not trigger the second slider GUI element, wherein any real world physical action triggering the second slider GUI element does not trigger the first slider GUI element.

19. The system of claim 18, wherein the respective predefined input pattern comprises one or more line segments, and the respective real world physical action comprises moving a slider element along the one or more line segments.

20. The system of claim 19, wherein a first action of the series of actions of the second avatar is an attack on the first avatar.

21. The system of claim 20, wherein the emulated respective real world physical action of the first avatar comprises at least one of a defensive maneuver and an attack maneuver performed on the second avatar in response to the first action.

22. The system of claim 21, wherein causing the at least one avatar to emulate the respective real world physical action performed by the user comprises dynamically animating, on a non-touchscreen portion of the touchscreen display device, the first avatar in real-time while the user inputs the respective predefined input pattern on the touchscreen portion of the touchscreen display device.

23. The system of claim 22, wherein cause the at least one avatar to continue emulating the respective real world physical action performed by the user after the user has inputted the respective predefined input pattern and until a predefined completion point is reached.

24. The system of claim 23, wherein displaying the series of GUI elements in response to receiving a selection of the first avatar through the touchscreen portion of the touchscreen display device.

* * * * *

UNITED STATES PATENT AND TRADEMARK OFFICE
CERTIFICATE OF CORRECTION

PATENT NO. : 8,556,720 B2
APPLICATION NO. : 12/014003
DATED : October 15, 2013
INVENTOR(S) : Viner et al.

Page 1 of 1

It is certified that error appears in the above-identified patent and that said Letters Patent is hereby corrected as shown below:

In the Claims:

Column 8, Claim 17, Line 67, delete "a";

Column 8, Claim 17, Line 67, delete ":" and insert --;-- therefor.

Signed and Sealed this
Fourth Day of February, 2014

Michelle K. Lee
*Deputy Director of the United States Patent and Trademark Office*